No. 792,009. PATENTED JUNE 13, 1905.
E. N. DOWNS.
TOOL FOR APPLYING CLINCHER TIRE CASINGS TO CLINCHER RIMS.
APPLICATION FILED SEPT. 15, 1904.
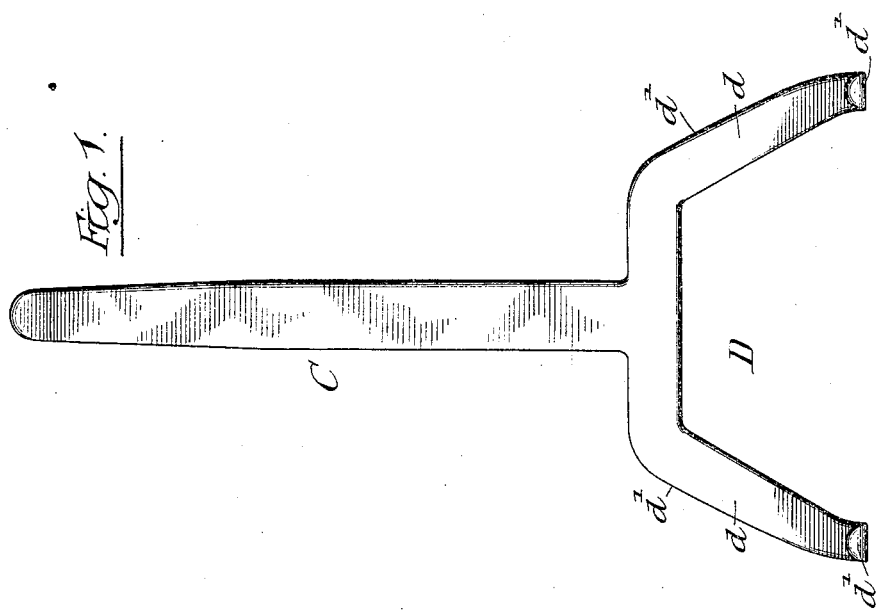
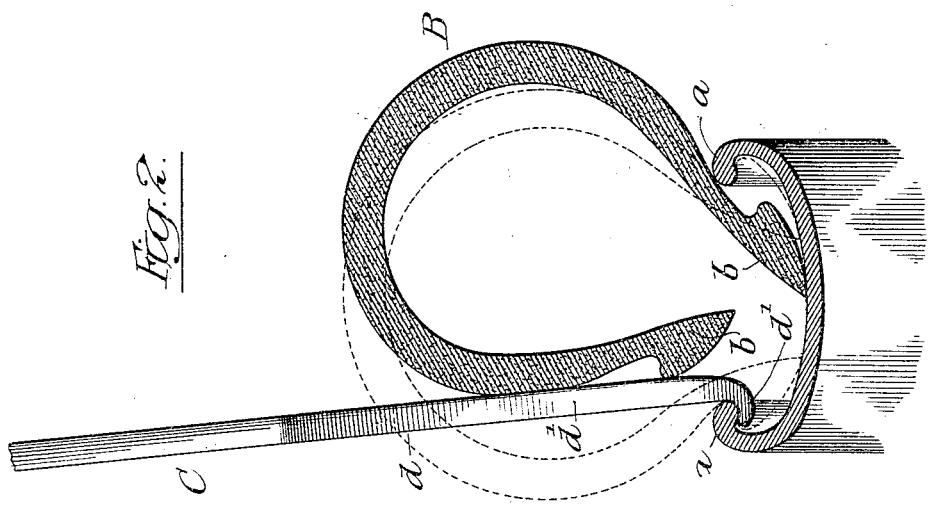

No. 792,009.

Patented June 13, 1905.

UNITED STATES PATENT OFFICE.

ELMER N. DOWNS, OF CHICAGO, ILLINOIS.

TOOL FOR APPLYING CLINCHER-TIRE CASINGS TO CLINCHER-RIMS.

SPECIFICATION forming part of Letters Patent No. 792,009, dated June 13, 1905.

Application filed September 15, 1904. Serial No. 224,626.

*To all whom it may concern:*

Be it known that I, ELMER N. DOWNS, a citizen of the United States, residing at Chicago, in the county of Cook and State of Illinois, have invented a certain new and useful Improvement in Tools for Applying Clincher-Tire Casings to Clincher-Rims, of which the following is a specification.

My invention relates to means for use in fitting the casings of "clincher-tires" to "clincher" wheel-rims.

Objects of my invention are to provide a simple and efficient device for such purpose, to lessen the labor involved, to render the operation of fitting the tires upon the rims comparatively easy, and to shorten the time necessary for such operation.

In the accompanying drawings, Figure 1 illustrates in side elevation a tool constructed in accordance with the principles of my invention. Fig. 2 shows the said tool in edge elevation and portions of a clincher-tire casing and clincher wheel-rim in cross-section, the said members being assembled to illustrate the act of fitting the tire upon the rim with the aid of the tool. In this view the ultimate position of the tire on the rim is indicated by dotted lines.

The clincher wheel-rim A is understood to be an ordinary annular wheel-rim of the well-known clincher type, and therefore formed with marginal flanges *a a*, which project inwardly, so as to overhang certain intervening rim portions and form hook portions under which the edge portions of the tire-casing engage. The tire-casing B is also understood to be an ordinary annular pneumatic-tire casing of the well-known clincher type and formed, therefore, with a divided base and having reinforced or thickened edge portions *b b*, which engage under the marginal flanges *a a* of the rim when the tire is in place thereon, as indicated by dotted lines.

The tool shown comprises a handle portion C and a pronged portion D, formed with a pair of prongs *d d*, having hook-shaped ends *d' d'*. The terminal portions of the prongs are bent laterally to the plane of the prongs and handle portion to form hooks *d'*, which are each adapted to engage under the inwardly-bent flanges of the clincher-rim. One of such hooks thus engaging one of the rim-flanges is shown in Fig. 2, it being understood that when the tool is applied as illustrated each of its two hooks will engage under the rim-flange in the same way. The tool thus described is practically adapted for use in applying heavy clincher-tires to the wheel-rims of automobiles, consisting as it does of a lever pronged at one end portion and having its prongs provided with laterally-projecting hooks adapted to extend under and interlock with one of the inwardly-projecting marginal hook-flanges of the wheel-rim, the hooks being so shaped and proportioned that with the tool in the plane of the wheel the prongs will accommodate themselves to the curve of the wheel and permit the tool to slide or travel peripherally around the rim and progressively apply the edge of the tire to the rim, while the tool thus applied and operated is between the edge portion of the tire and the adjacent hook-flange of the rim.

In fitting the tire to the rim the operator will first pass over the rim-flange (shown at the left in Fig. 2) the reinforced base edge of the casing shown at the right in such figure, so as to bring such base edge within the rim-channel formed between the two rim-flanges. It will be understood that in placing a clincher-tire on a clincher-tire rim the two reinforced edges of the tire-casing must be successively passed over one or the other of the two rim-flanges *a* and that each of such edges must pass over one and the same rim-flange, or, as commonly described, the tire must be put on the wheel from one or the other of its sides. In placing the first tire-casing edge on the rim the operation is much easier than the operation of placing the second tire edge casing on the rim, and while the tool I have described can be used in the work of prying parts of the first casing edge over the rim other means may be employed for such purpose. When a portion of the first edge of the casing has been slipped over the rim-flange, such portion naturally sinks into the general rim-channel, and this simplifies the work of prying the remaining portion of such casing edge over the rim-flange;

but as to the second casing edge, which must now be drawn over the same rim-flange, the conditions are quite different, and so far as I am aware no suitable tool prior to my invention has been produced for placing the second tire-casing edge of a clincher-tire on a clincher-rim with any approximation to the ease and rapidity with which I can place such second casing edge on the rim by means of my improved tool. I will therefore first assume that the first casing edge has been entirely placed upon the wheel-rim by any known or suitable means and then proceed to describe the use of my improved tool in placing the second casing edge on such rim, with the understanding that the entire circumferential length of the first casing edge has been placed within the rim-channel, as indicated in Fig. 2. After having thus worked one base edge of the tire-casing over one of the rim-flanges, so as to bring such base edge of the casing within the rim-channel, as illustrated, the operator can manually pass a portion of the other base edge of the casing over said rim-flange and then insert the pronged portion of the tool between such last-mentioned rim-flange and base edge of the tire-casing and cause the two hooks $d'$ of the tool to engage under said rim-flange, as in Fig. 2, and by then swinging the tool-handle laterally or transversely to the general plane of the rim in a direction from one to the other of its marginal portions the tool can be brought into the position shown in Fig. 2, and in so doing it will act as a lever fulcrumed at two points along the rim and pry up and over an edge portion of the tire-casing, as illustrated. In order to now work the entire portion of the annular edge portion of the tire-casing over the said rim-flange and into the rim-channel, the operator, still manually holding the tool by its handle C and with its hooks still engaging under the rim-flange, as in Fig. 2, will move the tool bodily edgewise in the arc of a circle concentric with the circle of the rim-flange, or, in other words, move the tool bodily in a circular path in a plane parallel with the general plane of the annular rim, and in thus drawing the tool circumferentially around the rim the prong in advance will take up the edge portion of the casing ahead of it and force the same over the rim-flange, as in Fig. 1, while the second prong, relatively in rear as to the line of progression, will coöperate with the advance prong and maintain over the rim-channel a sufficient length of the base edge portion of the tire-casing to insure the retention in the rim-channel of the edge portion of the casing which is forced over the rim-flange as the tool advances. During this operation the hooks of the tool keep in engagement with and slide along the under side of the rim-flange.

The prongs of the tool are spaced or set apart to permit them to maintain over the rim-channel a length of casing edge sufficient to prevent such casing edge from slipping outwardly over the rim-flange as the tool in moving forwardly leaves it, and, as shown, the prongs diverge toward their outer ends, whereby the outer-edge side prong which is ahead during the operation herein last described will form an incline $d'$, along which the casing edge will more readily slip up as the tool is forced against it, and as to the rear prong which is in rear during operation it will also form an incline $d'$, from which the casing edge will slide off gradually instead of abruptly, and thereby further assist in retaining the casing on the rim.

The advantage of a broad tool portion engaging under the rim-flange at points spaced in accordance with the spirit of my invention can be further shown as follows, to wit: If, for example, the handle C in place of having the flat prongs $d\ d$ should be merely extended in length and provided at one end with a single hook, like one of the hooks $d'$, such tool could be introduced between the casing and rim and used to pry an edge portion of the casing over the rim-flange; but this would cause merely an abrupt deflection of the casing edge at a point, and the part thus deflected and brought over the rim-channel would be so slight in length as to preclude its being easily or properly left in the rim-channel as the tool is advanced.

With the tool illustrated I also secure maximum leverage and relieve strain on the wrist of the operator, it being observed that where pneumatic tires are placed on rims for the wheels of automobiles and other vehicles the tires are of course heavy and generally difficult to handle, but that with the assistance of my invention these tires can be placed upon wheel-rims with comparative ease.

I am aware of patent to H. Beach, No. 602,252, April 12, 1898, illustrating a tool proposed as a means for removing and replacing a wired tire of the "Dunlop" type on a bicycle-rim of the well-known Dunlop construction. The tool shown in said patent is entirely impractical as a means for fitting a clincher-tire to a clincher-rim, for even if the entire tool shown is made rigid the bent ends of the parts A A shown in said patent can only be caused to lap under the edge of a clincher-rim flange by laterally deflecting the tool against the tire having one edge on the rim to an extent to unduly squeeze the tire, and to attempt to then slide the tool bodily in a circular path coincident with the plane of the wheel will result in the disengagement from the clincher-flange of the bent tool end second in order as to the direction of movement, it being also a fact that to thus unduly squeeze the tire will cause friction in opposition to sliding the tool in a circular path to an extent to render even such movement impractical, the elastic opposition of the tire to the undue lateral deflection of the tool also tending to disengage it from the rim-flange.

In accordance with my invention the hooks $d'$ must project laterally from the prongs $d$ to an extent to permit such hooks to lap under and engage the inwardly-extending flange $a$ of a clincher-tire rim at a time when the prongs are in or substantially in a plane parallel with the plane of the wheel, as illustrated in Fig. 2. I do not confine myself to this precise condition of parallelism, as the tool may be deflected slightly outwardly or to the left, as shown in Fig. 2, or it may be deflected slightly to the right from the position shown in said figure. If, however, the tool shown in Fig. 2 is deflected unduly to the right, it will compress the tire or tire-casing to an extent to cause too much friction between the tool and the outer side of the tire-casing during the operation of bodily moving the tool in a circumferential path, so as to cause its hooks to slide along the under side of the flanges $a$, and, moreover, in such case the elastic resistance of the tire or tire-casing will cause the hooks to bind with too great frictional contact against the marginal portion of the wheel-rim; but with the hooks of the prongs projecting laterally from such prongs substantially as illustrated the tool when in a position substantially as illustrated in Fig. 2 can be readily moved in a direction to cause its hooks to slide along the under side of the flange $a$, and thereby cause the edge portion of the tire-casing to be easily brought over the marginal flanged portion of the wheel-rim. When the tool is thus operated, the prongs thus provided with hooks must be rigid with the handle portion $C$ of the tool. As a further preferred arrangement the handle $C$ is shown extending along a line intersecting a right line between the hooks $d'$ $d'$ at a point midway between said two hooks.

What I claim as my invention is—

A tool for applying clincher-tires to their wheel-rims, consisting of a lever having rigid spaced prongs formed with laterally-projecting hooks which are adapted to extend under and interlock with one of the inwardly-projecting marginal hook-flanges of the wheel-rim, said hooks being shaped and proportioned so that with the tool in the plane of the wheel they will accommodate themselves to the curve of the rim and permit the tool to slide peripherally around the rim so as to progressively apply the edge of the tire to the rim when the tool thus applied and operated is between the edge portion of the tire and the adjacent hook-flange of the rim.

ELMER N. DOWNS.

Witnesses:
CHARLES G. PAGE,
OTTILIE C. FREIBERG.